June 18, 1929.    F. O. CLEMENTS    1,717,369
AIR CLEANER
Original Filed May 11, 1923
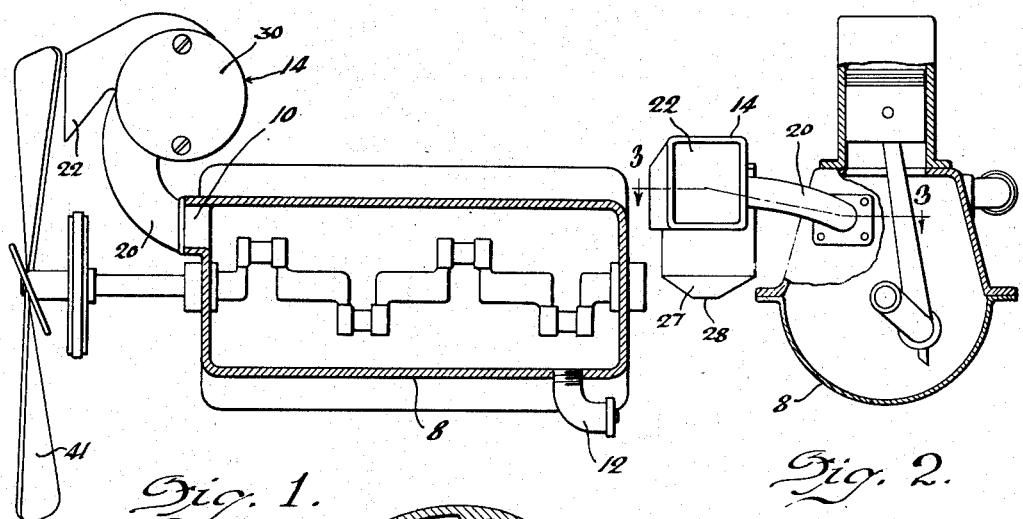
*Fig. 1.*    *Fig. 2.*
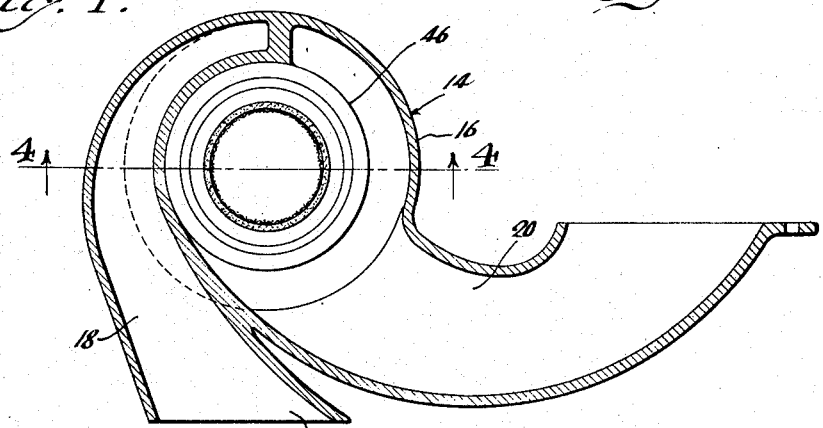
*Fig. 3.*
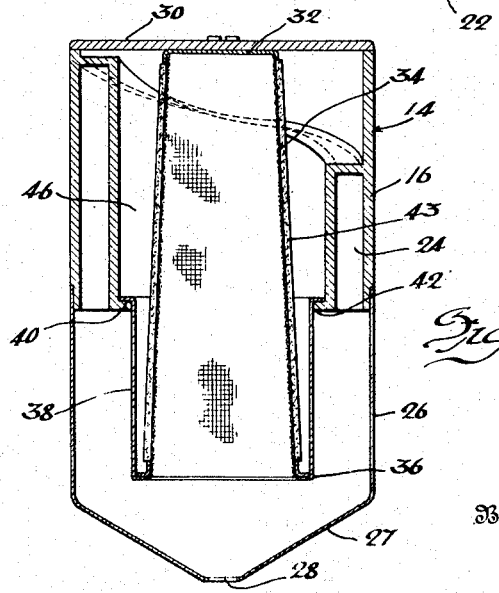
*Fig. 4.*
Inventor
Frank O. Clements
By Blackmore, Spencer & Hulse
Attorneys Patented June 18, 1929.

1,717,369

UNITED STATES PATENT OFFICE.

FRANK O. CLEMENTS, OF DETROIT, MICHIGAN, ASSIGNOR TO GENERAL MOTORS RESEARCH CORPORATION, OF DAYTON, OHIO, A CORPORATION OF DELAWARE.

AIR CLEANER.

Original application filed May 11, 1923, Serial No. 638,364. Divided and this application filed May 2, 1927. Serial No. 188,290.

This case is a division of my pending application, Serial Number 638,364 filed May 11, 1923.

The invention relates to air cleaners and particularly to cleaners of the type in which separation of dust particles is effected by causing the air to undergo abrupt changes in direction so as to cause the dust to be separated from the air stream by virtue of its greater inertia. In the present design this is accomplished by causing the air to follow a whirling course so that the dust particles are thrown outwardly and hug the walls of the casing. Provision is made for the discharge of the dust from the bottom of the casing. The clean air outlet communicates with the casing adjacent its axis so that none but relatively clean air passes through it. To insure that even the finest particles of dust are excluded, the outlet may be provided with a filter, which may take the form of a porous membrane supported on screening.

In the drawings Figure 1 is a somewhat diagrammatic view showing my air cleaner arranged to clean the air supplied the crank case of an internal combustion engine.

Figure 2 is an end view partly in section of the construction of Figure 1.

Figure 3 is a horizontal section on the line 3—3 of Figure 2 and Figure 4 a vertical section through the cleaner on the line 4—4 of Figure 3.

Reference character 8 indicates the crank case of an internal combustion engine, provided with an air inlet 10 and an air outlet 12. 14 indicates my air cleaner as applied thereto. While I have illustrated this specific application of my cleaner it is obvious that it is capable of use in supplying clean air to mechanisms of various types.

My cleaner consists of a cylindrical casing 16, provided with a tangential inlet 18 and an outlet 20 adapted for attachment to the crank case inlet 10. The outer end of the inlet 18 is in the form of a funnel 22 and discharges into a flattened spiral tube 24, leading into the interior of the casing. The casing 16 is provided with an extension 26 having a hopper like formation 27 at its lower end provided with a discharge port 28. The upper end of the casing 16 is closed by a cover 30. Within the casing is arranged a filter unit consisting of a cup shaped stamping 32 connected by screen 34 of conical form with annulus 36 seated within a second cup shaped member 38 provided with an outstanding flange 40 supported upon an inwardly turned flange 42 provided on the interior wall of the tube 24. Upon the screen 34 is mounted a filter 43, also conical in form. This filter may be made of loosely packed felt or similar material.

The cleaner operates as follows: In the installation shown the funnel 22 receives air from the engine cooling fan 41 and directs it in a spiral path. This causes dust particles to be thrown outwardly because of their greater inertia. These particles eventually reach the bottom of the casing and are discharged through port 28. The cleaned air upon reaching the bottom of the casing reverses its path and passes upwardly into the interior of the cone, through the screen 34 and filter 43 into the passage 46 communicating with outlet 20 leading to the crank case. The passage of the air through the filter eliminates all fine particles, particularly light organic matter which might otherwise be carried along with the air stream. As the centrifugal action effects the removal of the major portion of the dust, it is obvious that the filter may be omitted if desired. In the application shown, the air thus relieved of its dust content, passes into the crank case where it effects evaporation of diluents and is finally discharged through outlet 12.

I claim:

An air cleaner comprising a cylindrical casing, means at one end of the casing for admitting air therein and giving it a whirling motion, said last named means being provided with an inwardly directed annular supporting portion, a tubular member having an outwardly extending annular flange resting on said annular supporting portion and having an inwardly extending flange, a cover for the casing, and a tubular filter member having one end resting on said second named flange and the other end engaged by the cover, said casing being provided with a dust outlet on the intake side of the filter and with a clean air outlet on the discharge side of the filter.

In testimony whereof I affix my signature.

FRANK O. CLEMENTS.